United States Patent [19]

Lach et al.

[11] 3,774,828
[45] Nov. 27, 1973

[54] STEP MOTION PROJECTOR
[75] Inventors: Robert E. Lach, Beaverton; Jack A. Baldwin, West Linn, both of Oreg.
[73] Assignee: GAF Corporation, New York, N.Y.
[22] Filed: Oct. 13, 1972
[21] Appl. No.: 297,429

[52] U.S. Cl. .................................. 226/66, 352/180
[51] Int. Cl. ............................................. G03b 1/22
[58] Field of Search ................ 226/64, 65, 66, 122; 352/180

[56] References Cited
UNITED STATES PATENTS

| | | | |
|---|---|---|---|
| 3,481,662 | 12/1969 | Procop | 352/180 |
| 3,524,573 | 8/1970 | Kotler et al. | 226/122 X |
| 3,556,649 | 1/1971 | Nupnau | 226/66 |
| 3,592,373 | 7/1971 | Kim | 226/66 |
| 3,612,370 | 10/1971 | Thevenaz | 226/65 |
| 3,025,753 | 3/1962 | Rodgers et al. | 226/64 X |

*Primary Examiner*—Allen N. Knowles
*Attorney*—Walter C. Kehm et al.

[57] ABSTRACT

A film transport mechanism for advancing perforated motion picture film through a projection gate is provided. The mechanism comprises a film transport shuttle having a film engaging drive claw at one end for intermittent engagement with the perforations of the film, and a single motor-driven rotatable cam to effectuate both horizontal and vertical motion for the shuttle. The cam engages a pair of horizontally disposed cam follower surfaces mounted within an opening formed in the center of the shuttle to effectuate vertical motion thereof, and also engages a vertically disposed projection on the rear of the opening in the shuttle to effectuate horizontal motion to withdraw the claw from the film perforations. Slow motion and still projection are accomplished by means of a speed selector cam having a series of intercepting cam surfaces each representing a different projection speed, which cam is linked by means of a suitable gear train to the main drive cam. The selector cam rotates at a speed which is a fraction of the speed of the main drive cam and is positioned so that the intercepting cam surfaces may be selectively moved into engagement with a cam follower mounted on the end of the shuttle opposite from the claw to intercept the inward movement of the shuttle, and thus intermittently prevent its engagement with the film perforations. The number of lobes or valleys on each of the intercepting cam surfaces determines the frequency with which the claw on the shuttle will be permitted to engage the film perforations. For still projection, the intercepting cam surface completely prevents the inward movement of the film shuttle.

10 Claims, 9 Drawing Figures

PATENTED NOV 27 1973 3,774,828

STEP MOTION PROJECTOR

BACKGROUND OF THE INVENTION

Film transport means have been provided in the past for producing slow motion and stop projection, as well as normal speed projection. These devices generally employ a shuttle having a film engaging claw at one end which is biased by means of the spring into engagement with the perforations of the film. A rotatable cam engages an opening formed within the shuttle and is operable to effectuate vertical movement of the shuttle, i.e., movement which is parallel to the film path. A secondary series of cams is adapted to positively engage a cam follower formed on the end of the shuttle opposite from the claw to horizontally withdraw the claw from the film perforations at a pre-determined frequency. In other words, to effectuate shuttle movement which is perpendicular to the film path. This type of design is characterized by the fact that the secondary cam positively engages the cam follower to withdraw the claw from the film perforations.

A device of this type is shown in U.S. Pat. No. 3,481,662 to Procop. In the Procop device the secondary cam comprises a plurality of axially disposed cams, each having a different number of lobes to control the frequency with which the claw engages the film perforations, and thereby permits changes in the film projection speed. To effectuate such speed changes, means are provided to selectively move the desired cam into contact with the cam follower.

As an improvement over this type of film transport, it has been proposed to provide a film transport shuttle which utilizes a single drive cam to effectuate both horizontal and vertical motion of the claw, and which employs means to intermittently intercept the film transport shuttle to prevent its engagement with the film perforations at pre-determined frequencies to effectuate slow motion projection. A film transport means of this type is shown in U.S. Pat. No. 3,524,573 to Kotler et. al. Kotler et. al. employs a secondary cam which is operatively driven by a gear network linked to the main drive cam. A pivotally mounted spring biased lever having a cam follower formed thereon is adapted to be selectively moved into slideable engagement with the secondary cam. An interceptor arm also attached to the lever intermittently engages a projection formed at the back end of the film shuttle during rotation of the secondary cam to prevent its engagement with the film perforations, and thereby accomplish slow motion projection. A second lever not linked to the secondary cam is manually movable into contact with the projection on the shuttle to completely prevent its engagement with the film perforations, and thus accomplish still projection.

While Kotler, et. al. is somewhat of an improvement over earlier film transport devices requiring positive engagement by two inter-related cams to effectuate horizontal and vertical movement of a film shuttle, it still suffers from several deficiencies, since it requires the manual actuation of two alternately operable control levers to effectuate either slow motion or still projection. This increases the complexity and cost of the projector, reduces its reliability and renders it less desirable for use by the average consumer. In addition, the device utilizes a single speed control cam, which is operable to select merely a single slow motion speed, rather than a plurality of speeds.

The present invention represents an improvement over these patents by providing a projector capable of normal projection speed, at least two slow motion speeds and stop action by the use of simplified speed selector cams.

SUMMARY OF THE INVENTION

In accordance with the present invention, an improved film transport mechanism for advancing perforated motion picture film through the projection gate of a motion picture projector or the like is provided, comprising a film transport shuttle, which is driven by a single rotatable cam to effectuate both vertical and horizontal motion thereof. The improvement resides in the provision of a rotatable speed selector cam comprising a series of intercepting cam sections, each corresponding to a different film speed including still projection, which are operatively linked to the main drive cam, and which are adapted to selectively engage a cam follower formed directly on the transport shuttle to intermittently stop the inward movement of the shuttle, and thereby control the frequency with which the shuttle engages perforations formed in the film. By utilizing the selector cam to stop the inward movement of the shuttle at the desired frequency, each of the various available film speed modes including still projection, can be selected by manual movement of a single control knob. In this manner, the structure and operation of the film transport mechanism is greatly simplified, its reliability significantly improved, and its desirability for use by the average consumer increased.

In general, the film transport mechanism of the present invention comprises a film transport shuttle mounted for both horizontal and vertical reciprocating movement and having at least one claw member formed on an end thereof; a rotatable drive cam in operative engagement with said shuttle to impart said horizontal and vertical reciprocating movement thereto, so that said claw member intermittently engages the film perforations to pull the film through the projection gate; a selector cam for controlling the film speed having a plurality of cam sections, each corresponding to a different film speed, including still projection, said cam surfaces being axially movable for selectively intercepting the shuttle during its horizontal inward movement with respect to the film path to control the frequency with which the claw member engages the film perforations; means for rotating the selector cam in timed relation to said drive cam to establish synchronization therebetween; and selector means operatively connected to said selector cam to move the selected cam section into position to intercept the shuttle, and thereby establish the desired film speed.

The drive cam is connected to a drive shaft which is operatively linked to the drive motor of the projector. The drive shaft is disposed perpendicularly to the plane of the shuttle and also carries thereon the shutter for the projector, to establish synchronization between the film movement and the chopping of the projection light. The drive cam is preferably formed with a pair of axially disposed cam sections. The first cam section engages a pair of horizontally disposed cam follower surfaces mounted within an opening formed at the center of the film transport shuttle to effectuate vertical motion thereof and the second cam section engages a vertically disposed projection on the rear of the opening in the shuttle to effectuate the horizontal outward motion to withdraw the claw from the film perforations. If desired such movement can also be accomplished by a single cam section having the required shape. The shuttle is inwardly biased by means of a spring or the like into a film perforation engaging position, and the drive cam overcomes such biasing force to withdraw the claw from the film perforations. The cam surfaces of the drive cam are arranged in a manner such that the film shuttle claw is withdrawn from the film perforations at the bottom of the downward stroke thereof, and is reinserted into the film perforations at the top of the vertical stroke, so as to accomplish film pull-down through the projection gate.

The selector cam is axially slidable and rotatably mounted on a shaft, the axis of which is parallel to the axis of rotation of the drive cam, and is linked to the drive cam by a suitable gear train. The selector cam comprises a plurality of axially disposed parallel cam sections, each of which has a different number of lobes or valleys corresponding to normal projection speed, selectively movable along the axis of the shaft by the selector means into engagement with a cam follower mounted on the end of the shuttle opposite from the claw. In this manner, the desired cam section intercepts the inward movement of the shuttle to intermittently prevent its engagement with the film perforations, and thereby adjust the film speed to the desired rate. It should be noted that for still projection the appropriate cam section is sized so as to intercept the shuttle and hold the same out of film engagement throughout its cyclic movement. It is quite apparent that with this arrangement the number of different projection speeds available is merely dependent on the number of different cam sections provided on the selector cam.

To establish proper speed control it is important to synchronize the rotational movement of the drive cam and the selector cam, so that the drive cam rotates at a speed which is an even multiple of the speed of the selector cam. In this manner, the drive cam itself can be adapted to operate the shuttle at the normal projection speed of 18 feet per second without interception by the selector cam, and the intercepting selector cam sections come into operation only during slow motion or still projection. For example, if during normal speed projection the drive claw engages the film perforations once for each shuttle cycle, to accomplish slow motion projection at the film speed six frames per second it is necessary to intercept the inward movement of the film transport shuttle in a manner which permits film engagement once for every three shuttle cycles. If the selector cam speed is set at one-ninth the drive cam speed, the required cam section for a film speed of 6 FPS can be formed as a circular disc having three equally spaced valleys or cut-out sections formed therein. Each time the cam follower mounted on the shuttle engages a valley, it is permitted to engage the film perforation, and thus advance the film. Similarly, if the selected cam section has but one valley formed therein, the speed will be reduced to one-ninth of the normal speed or 2 FPS. Other speeds can be provided by altering the number of valleys formed in the selector cam or by adjusting the speed ratio between the drive cam and the selector cam. As mentioned hereinbefore, the selector cam is mounted for axial movement along a shaft perpendicular to the plane of the film transport shuttle to permit selection of the desired cam section corresponding to the selected speed. The selector means is in the form of a manually operable knob having an arm associated therewith for engagement with the selector cam. Rotation of the knob effectuates movement of the selector cam into the desired position.

Also associated with the selector cam is an eccentric mounted framing means which permits a shifting of the path travelled by the film-engaging claw of the transport shuttle to permit proper centering of the film frames upon the projection screen.

The invention is more fully described with reference to the accompanying drawings.

DESCRIPTION OF THE PREFERRED EMBODIMENTS

Figure 1:
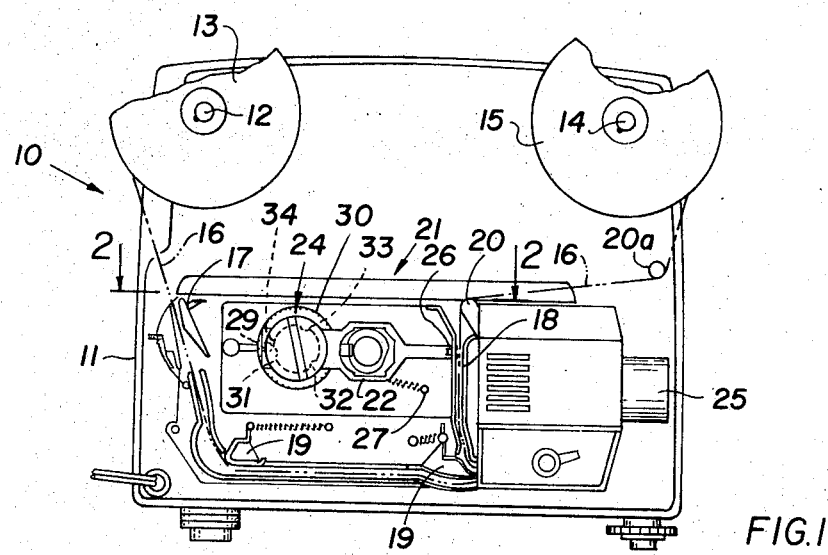
FIG. 1 is a side elevation view of a projector incorporating the film transport mechanism of the invention.

Referring now to FIG. 1, a motion picture projector is indicated generally at 10, consisting of a mounting plate 11 on which is mounted a spindle 12 supporting a take-up reel shown fragmentarily at 13. A second spindle 14 is journaled at the forward part of the plate 11 and mounts a supply reel 15 of conventional design. The path of the film is shown by the phantom lines 16, and in the direction of forward movement extends around a hub 20a, a tensioning guide or snubber 20, through a film gate 18, past tension means 19 and finally through a take-up adjustment 17. A film transport mechanism 21 in accordance with the invention is mounted on the projector for advancing the film 16 through film gate 18 at a selected rate of speed for projection on a screen (not shown) through a lens assembly 25 of conventional construction.

Figure 3:
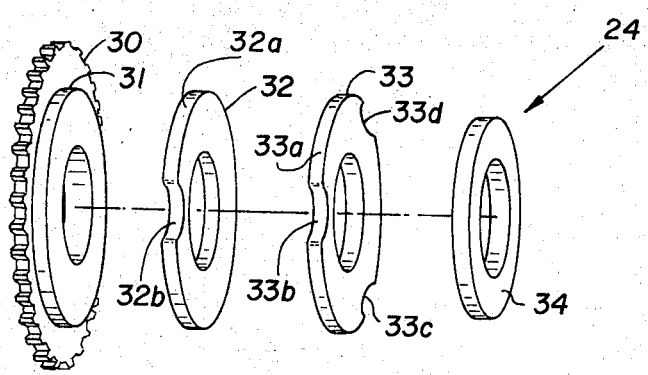
FIG. 3 is an exploded perspective view of the selector cam showing the various cam sections thereof.

The transport assembly comprises a shuttle 22 having a pair of claw members 26 disposed at one end thereof for intermittently engaging the perforations of the film 16, to pull the film through gate 18, and a motor driven drive cam 23 to reciprocally move the shuttle along horizontal and vertical paths. A biasing spring 27 urges the drive claw member 26 into engagement with the perforations of film 16. A selector cam 24 for controlling the film speed having a plurality of cam sections 31, 32, 33 and 34 corresponding, respectively, to still projection, two speeds of slow motion projection and normal speed projection is rotatably and slidably mounted on fixed shaft 50 adjacent one end of the shuttle. Each of the cam sections is adapted to selectively intercept the shuttle during its horizontal inward movement by engaging a cam follower pin 29 mounted on the end of shuttle 22 opposite from claw member 26, thereby controlling the frequency with which claw member 26 enters the film gate 18 and, hence, the speed of film past the projection lens. The shape of each of the cam sections comprising selector cam 24 is shown in FIG. 3 and will be described hereinafter.

The construction of the drive cam 23 and its engagement with the film transport shuttle 22 can be seen in FIGS. 2, 4, 5 and 6. The drive cam is fixedly mounted on the end of a rotatable shaft 80, which is operatively connected to the drive motor of the projector for rotational movement therewith. A conventional blade-type shutter (not shown) is also mounted on shaft 80, to establish synchronization between the shutter operation and the advancement of the film through the projection gate. The drive cam 23 comprises a first cam section 51 which cyclically engages horizontally extending cam follower surfaces 52 and 53 which partially define an opening 54 formed in the center of shuttle 22, to effectuate oscillating vertical movement of the claw member, and a second cam section 56 of smaller dimensions which is adapted to engage a vertically disposed cam follower projection 57 outwardly extending from one end of opening 54. Cam follower 57 is held in sliding engagement with cam section 56 be means of the biasing spring 27. The camming surfaces of drive cam sections 51 and 56 are such that their rotational sliding engagement with the cam follower surfaces formed within the central opening of shuttle 22 oscillates the shuttle in both horizontal and vertical directions, a manner which causes the drive claw member 26 to follow a generally rectangular path as shown by the arrows in FIG. 5. Such movement of claw member 26 represents normal speed operation of the projector, whereby the claw member 26 engages the perforations of film 16 in gate 18 once during each revolution of the drive cam.

Drive cam 23 also has an integrally formed gear 35 co-axial therewith, which operatively engages a second gear 30 formed as an integral part of the selector cam 24. Gears 30 and 35 are sized such that selector cam 24 is rotatably driven at a rotational speed which is a fraction of the rotational speed of the main drive cam 23 to maintain a predetermined speed ratio between the two cams, since such ratio is a critical factor in the design of the selector cam sections. In the preferred embodiment, gear 30 rotates at a speed which is one-ninth the rotational speed of gear 35.

Figure 9:
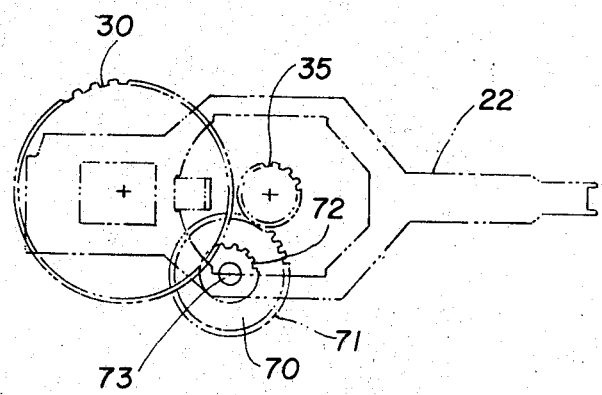
FIG. 9 is a front elevation view showing the addition of an idler gear between the drive cam and the selector cam.

In FIG. 9 an alternate means for driving the selector cam 24 is shown. In this embodiment a step idler gear 70 rotatably mounted on a fixed shaft 73 is provided. The gear has a first gear section 71 for engagement with gear 35 of the drive cam 23, and a second gear section 72 of smaller diameter for engagement with gear 30 of the selector cam 24. In some instances, in order to establish the proper speed ratio between the drive cam 23 and the selector cam 24, it is useful to interpose this or a similar type of idler gear. The idler gear serves no other purpose than to properly establish the speed ratios between the two cams and is useful when space limitations in the particular projector in which the film transport mechanism of the invention is employed prohibit the use of a sufficiently large drive gear attached to selector cam 24.

Figure 4:
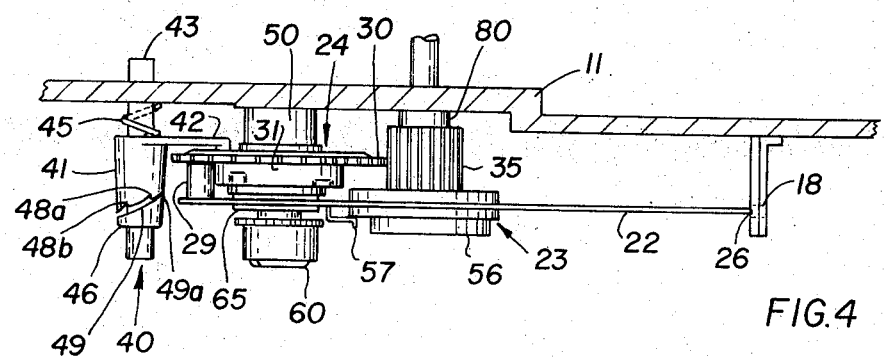
FIG. 4 is a view similar to FIG. 2 with the selector cam adjusted for still projection.
Figure 5:
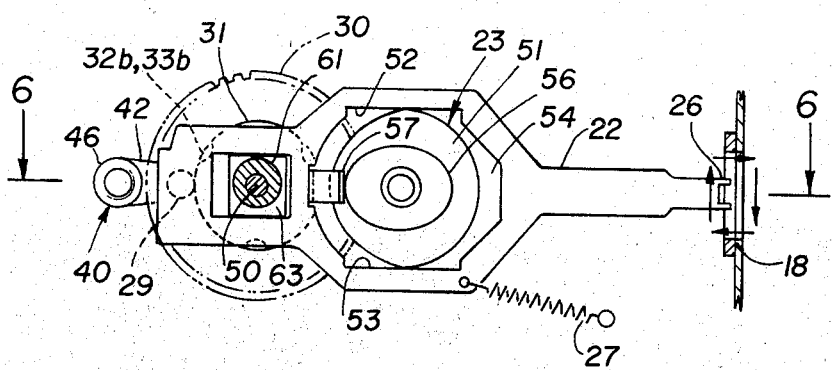
FIG. 5 is a partial front elevation view of the mechanism shown in FIGS. 2 and 4 with the mountings removed and illustrating the locations of the cams relative to each other.

The several cam sections which comprise selector cam 24 are shown in FIG. 3. The first cam section 31 is disposed adjacent gear 30 and has a circular cam surface of sufficiently large diameter to completely prevent the inward horizontal movement of the film shuttle 22 upon its selective engagement with cam follower 29 mounted on shuttle 22, and is hence used for still projection. The engagement of cam section 31 by cam follower 29 is shown in FIG. 4. It should be noted that during still projection drive cam 23 and selector cam 24 continue to rotate at their normal speeds so as to oscillate the drive claw 26 in a vertical direction, but that the engagement of drive claw 26 with the film in gate 18 is prevented by the continuous interception of cam follower 29 by cam section 31.

Cam section 32 is utilized for slow motion projection at one-ninth the normal projection speed, and has a generally circular cam surface 32a with a single cut-out or valley portion 32b formed therein. The diameter of cam surface 32a substantially is sustantially the same as that of cam section 31, and thus serves to intercept the inward movement of shuttle 22 when cam section 32 is moved into selective engagement with cam follower 29. However, valley portion 32b is of sufficient depth, so that upon the engagement of cam follower 29 therewith, biasing spring 27 urges drive claw 26 into engagement with the film perforations. As noted hereinabove, in the preferred embodiment the selector cam 24 rotates at a speed which is one-ninth the speed of the drive cam 23. Accordingly, cam section 32 will permit the drive claw 26 to engage the film perforations once for every nine revolutions of the drive cam 23, and thus effectuate an eight-ninths reduction in projection speed. The engagement of cam follower 29 and slow motion cam section 32 is not specifically shown.

Figure 6:
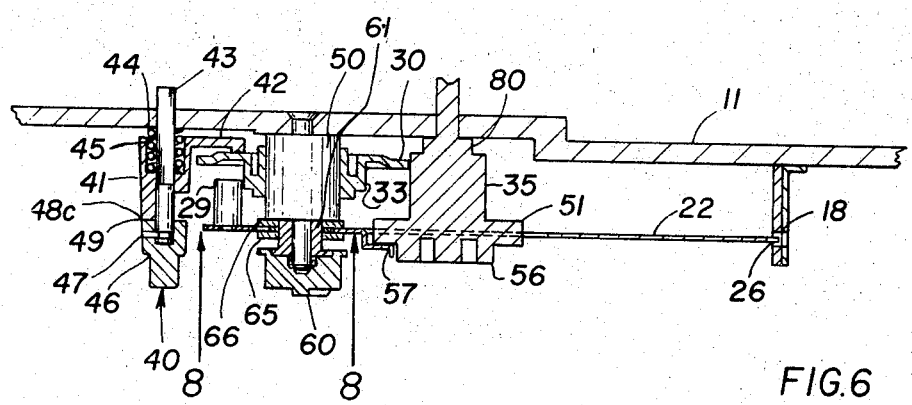
FIG. 6 is a cross-sectional view taken along the lines 6—6 of FIG. 5.

Cam section 33 is also utilized for slow motion projection, but in this case the cam section is operative to reduce the film speed to one-third of the normal projection speed. Section 33 has a generally circular cam surface 33a having a diameter which is substantially the same as still projection cam 31, and has three equally spaced valleys 33b, 33c and 33d formed therein. When cam section 33 is moved into selective engagement with cam follower 29 it can be seen that the claw member 26 will be permitted to engage the film perforations three times for each revolution of selector cam 24 or each nine revolutions of drive cam 23, thus reducing the film speed to one-third of the normal projection speed. During the remaining two-thirds of the time cam surface 33a intercepts cam follower 29 to prevent the inward movement of shuttle 22. The engagement of cam follower 29 and selector cam section 33 is shown in FIG. 6.

It is important to note that the position of the valleys formed in the slow-motion cam sections must be synchronized with the surface contour of the horizontal drive cam section 56 to insure that the shuttle will be biased into film engagement when the valleys in the selector cam are in radial alignment with cam follower 29.

Figure 2:
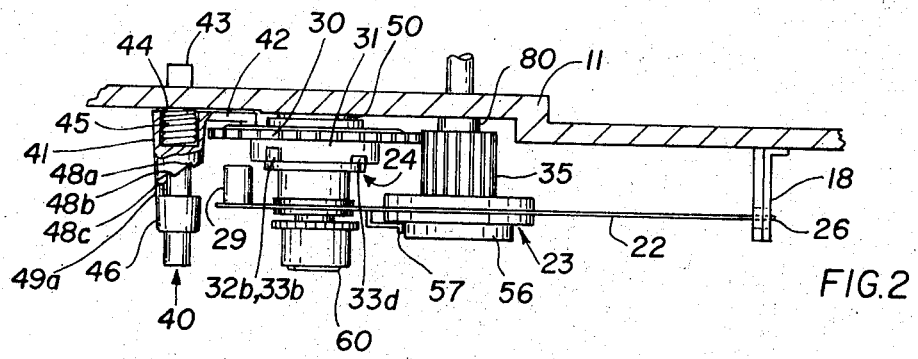
FIG. 2 is a cross-sectional view taken generally along the lines 2—2 of FIG. 1 with the speed selector knob in the normal drive position.

Cam section 34 is selectively movable into engagement with cam follower 29 to permit normal speed advancement of the film through film gate 18. Section 34 is a circular cam having a diameter which is sufficiently small so as not to prevent the inward movement of shuttle 22, and thereby permits its operation solely by drive cam 23, which as mentioned above reciprocates the shuttle at a rate corresponding to the normal projection speed. It will be appreciated by those skilled in the art that cam section 34 can be eliminated, and that for normal speed operation cam follower 29 can be moved completely out of engagement with any of the cams comprising selector cam 24. Furthermore, additional or different speeds can be provided simply by the use of further cam sections having different numbers of valleys, and/or by altering the speed ratio between the drive cam and the selector cam. FIG. 2 shows the cam position for normal speed.

Film speed selection is accomplished by means of manually operable selector 40. The selector 40 comprises a cylindrical post 41 having an arm 42 integral therewith in engagement with the underside of gear 30, as seen in FIGS. 2, 4 and 6. Post 41 is hollow and is mounted for sliding engagement on a stud 43 which is rotatably disposed in an opening formed in mounting plate 11. An enlarged internal chamber 44 formed within the post 41 receives a helical compression spring 45, which biases the post away from plate 11 and the integral lever arm 42 into contact with gear 30 of selector cam 24. A manually operable knob 46 is mounted on the end of stud 43, and is fixedly secured thereto by means of pin 47, thus serving to hold post 41 in place. The end of post 41 is formed with the helically shaped camming surface 48 having three positioning steps 48a, 48b and 48c formed therein. The end of knob 46 is formed with a corresponding helically shaped camming surface 49, which slidably engages camming surface 48 upon rotation of knob 46, and terminates at a point 49a adapted to selectively engage steps 48a, 48b and 48c of camming surface 48. It can be seen that spring 45 urges camming surface 48 of post 41 into operative engagement with corresponding camming surface 49 of knob 46. In addition, it should be noted that spring 45 applies sufficient force to post 41, so that arm 42 axially moves selector cam 24 along shaft 50 into engagement with cam follower 29 of the shuttle. However, the engagement of cam surface 48 of post 41 and cam surface 49 of knob 46 limits the outward movement of post 41 and thus positions the desired selector cam section for engagement with cam follower 29. The shape of the corresponding cam surfaces 48 and 49 is such that rotational movement of surface 49 with respect to surface 48 permits axial movement of post 41 either toward or away from mounting plate 11. In the outward direction spring 45 is operative to axially move post 41, while in the inward direction knob 46 directly moves post 41 along stud 43.

The steps 48a, 48b and 48c formed on camming surface 48 correspond to the various selectable speeds, i.e. 48a for slow motion projection at the rate of two frames per second; 48b for slow motion projection at the rate of six frames per second; and 48c for normal speed projection. In each of these positions the appropriate step is engaged by point 49a of knob 46 to lock the selector cam in the desired position. For still projection in which cam surface 31 engages cam follower 29, the surfaces of the two camming sections 48 and 49 are in matching alignment as shown in FIG. 4. When the selector knob 46 is rotated from the still projection position shown in FIG. 4 to the normal speed projection position shown in FIG. 6, arm 42 temporarily disengages the surface of gear 30. At that point the rotational force of the selector cam 24 against cam follower 29 causes the selector cam 24 to be moved axially along shaft 50 toward mounting plate 11. Each of the cam sections 31, 32 and 33 is formed with a slight draft angle on its outer surface so that the engagement of these surfaces with the cam follower 29 creates an inward biasing force to return the selector cam to a position of normal speed projecion. Accordingly, normal speed, slow motion and still projection are selected simply by rotating knob 46 to the desired position.

Figure 7:
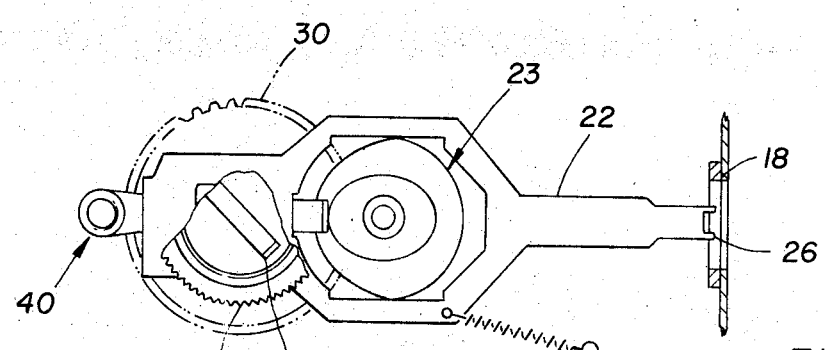
FIG. 7 is an elevation view similar to FIG. 5 with portions of the framing knob broken away.
Figure 8:
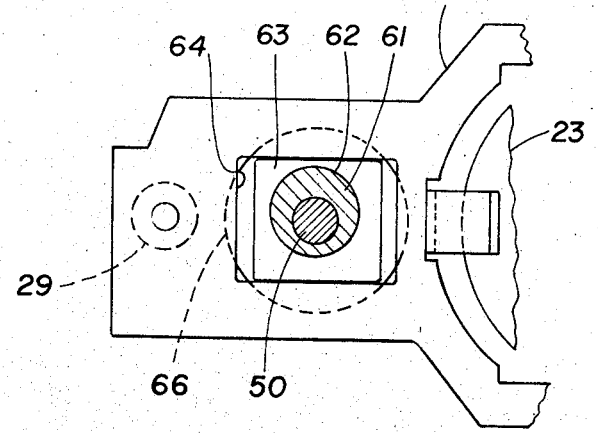
FIG. 8 is an enlarged cross-sectional view taken generally along the lines 8—8 of FIG. 6.

Referring now to FIGS. 6 through 8, the framing arrangement will be specifically described. The framing assembly is shown in cross-section in FIG. 6 and includes a framing knob 60 supporting a cam 61, which may be press-fitted into the rearward part of the knob and is eccentrically mounted on the shaft 50 for rotation thereabout. In FIG. 8 it can be seen that a camming surface 62 on the cam 61 is positioned within a slide block 63, which is recieved in a generally rectangular opening 64 formed in the rearward part of the shuttle 22. A pair of annular guides 65 and 66 are disposed on opposite sides of the block 63 to maintain shuttle 62 properly located on the cam surface 62. As is well known in projectors of this type, framing is easily accomplished by merely changing the location of the path travelled by the claw member 26 either up or down, so that the frames are properly positioned relative to the gate apertures. This manner of framing is the same in the present design. However, framing is more complicated where one or more interceptor cams are provided on a single shaft. As is evident, the problem of providing a suitable framing arrangement becomes more difficult if the overall simplicity and the associated reliability of the projector is to be retained.

In the present design the framing knob 60 shown fragmentarily in FIG. 7 may be rotated causing the cam 61 to rotate the cam surface 62 within the block 63. By reason of the eccentric mounting of the cam 61, this movement causes a vertical shifting of the rearward part of shuttle 22, thus pivoting the shuttle about drive cam 23. This in turn causes the claw member 26 on the opposite end of the shuttle 22 to move upward or downward to a slight degree to insure the proper framing of the film passing through the gage. It is to be appreciated that the speed selection may be performed without affecting the framing adjustment, inasmuch as the selector cam 24 is axially movable along an axis disposed at right angles to the plane of movement of the claw member 26 and the shuttle 22. In addition, the position of the cam follower 29 is not affected by the axial shifting of selector cam 24, and, therefore, once properly framed, the film will remain framed when selection is made from one of the speed control cam surfaces to the other. Accidental shifting of the framing knob can be avoided by providing a spring detent which cooperates with teeth 68 formed on the outer circumference of the framing knob 60, such expedient being well known in the art.

From the foregoing description it can be appreciated that the selection of a suitable film speed is easily accomplished. The mechanism which provides for normal speed, slow motion and stop action viewing is extremely simple when contrasted with prior art types, permitting the addition of this feature to relative inexpensive projector designs without a substantial increase in overall costs, and making this feature available on inexpensive models.

Upon consideration of the foregoing, it will become obvious to those skilled in the art that various modifications may be made without departing from the invention embodied herein. For example, the shuttle can be rotated 90° about the drive cam and the film fed horizontally through the film gate. In such a case it will be understood that references made to horizontal and vertical movement of the shuttle are merely relative terms referring to the position of the shuttle with respect to the film path.

What is claimed is:

1. A film transport mechanism for advancing perforated motion picture film through a projection gate of a motion picture projector, comprising a film transport shuttle mounted for both horizontal and vertical reciprocating movement and having at least one claw member formed on an end thereof; a rotatable drive cam in operative engagement with said shuttle to impart said horizontal and vertical reciprocating movement thereto, so that said claw member intermittently engages the film perforations to pull the film through the projection gate; a selector cam for controlling the film speed having a plurality of cam sections each corresponding to a different film speed, including still projection, said cam sections being axially movable for selectively intercepting the shuttle during its horizontal inward movement toward the film to control the frequency with which the claw member engages the film perforations; means for rotating the selector cam in timed relation to said drive cam; and selector means operatively connected to said selector cam to move the selected cam section into position to intercept the shuttle and thereby set the desired film speed.

2. A film transport mechanism in accordance with claim 1, in which the drive cam is operatively connected to a drive motor in the projector.

3. A film transport mechanism in accordance with claim 1, in which the drive cam comprises a pair of axially disposed cam sections having different cam surfaces, the first of said sections being adapted to impart reciprocating horizontal movement to said shuttle and the second of said sections being adapted to alternately impart vertical movement to said shuttle, so that said claw member travels in a generally rectangular path.

4. A film transport mechanism in accordance with claim 3, in which the shuttle has a vertically disposed cam follower formed thereon for engagement with the first drive cam section and a pair of spaced apart horizontal cam followers for engagement with the second drive cam section.

5. A film transport mechanism in accordance with claim 1, further comprising biasing means to horizontally urge the shuttle toward the film.

6. A film transport mechanism in accordance with claim 1, in which the selector cam is axially slidable on a shaft, the axis of which is parallel to the axis of rotation of the drive cam.

7. A film transport mechanism in accordance with claim 1, in which the selector cam sections are axially and parallelly disposed, each having a different cam surface; and in which a cam follower is mounted on the shuttle for engagement with the selected cam section.

8. A film transport mechanism in accordance with claim 7, in which the selector cam further includes a drive gear in operative engagement with the rotating means.

9. A film transport mechanism in accordance with claim 1, in which the means for rotating the selector cam comprises a first drive gear formed as an integral part of the drive cam; and a second drive gear formed as an integral part of the selector cam in operative engagement with said first drive gear.

10. A film transport mechanism in accordance with claim 1, in which the selector means comprises a manually rotatable knob having distinct positions for each available projection speed, and an arm linked to said knob for engaging the selector cam to axially move the same into the desired position upon rotation of said knob.

* * * * *